Aug. 14, 1934.    H. H. EATON    1,969,734
AUTOMATIC ARMATURE WINDING MACHINE
Filed July 2, 1928    5 Sheets-Sheet 1
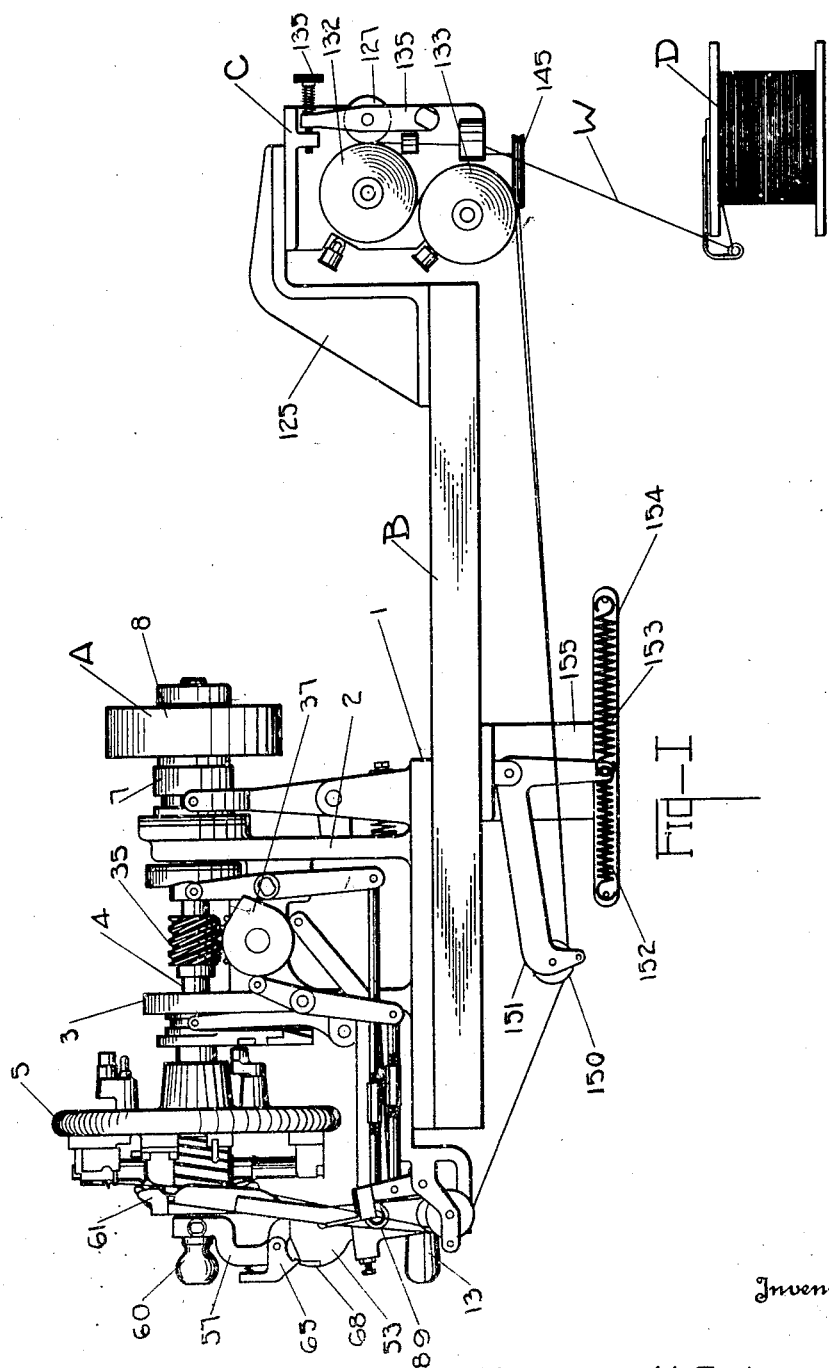
Inventor
Harrison H. Eaton
By Baselton, Whitcomb & Davis
Attorneys Aug. 14, 1934.　　　H. H. EATON　　　1,969,734
AUTOMATIC ARMATURE WINDING MACHINE
Filed July 2, 1928　　　5 Sheets-Sheet 2
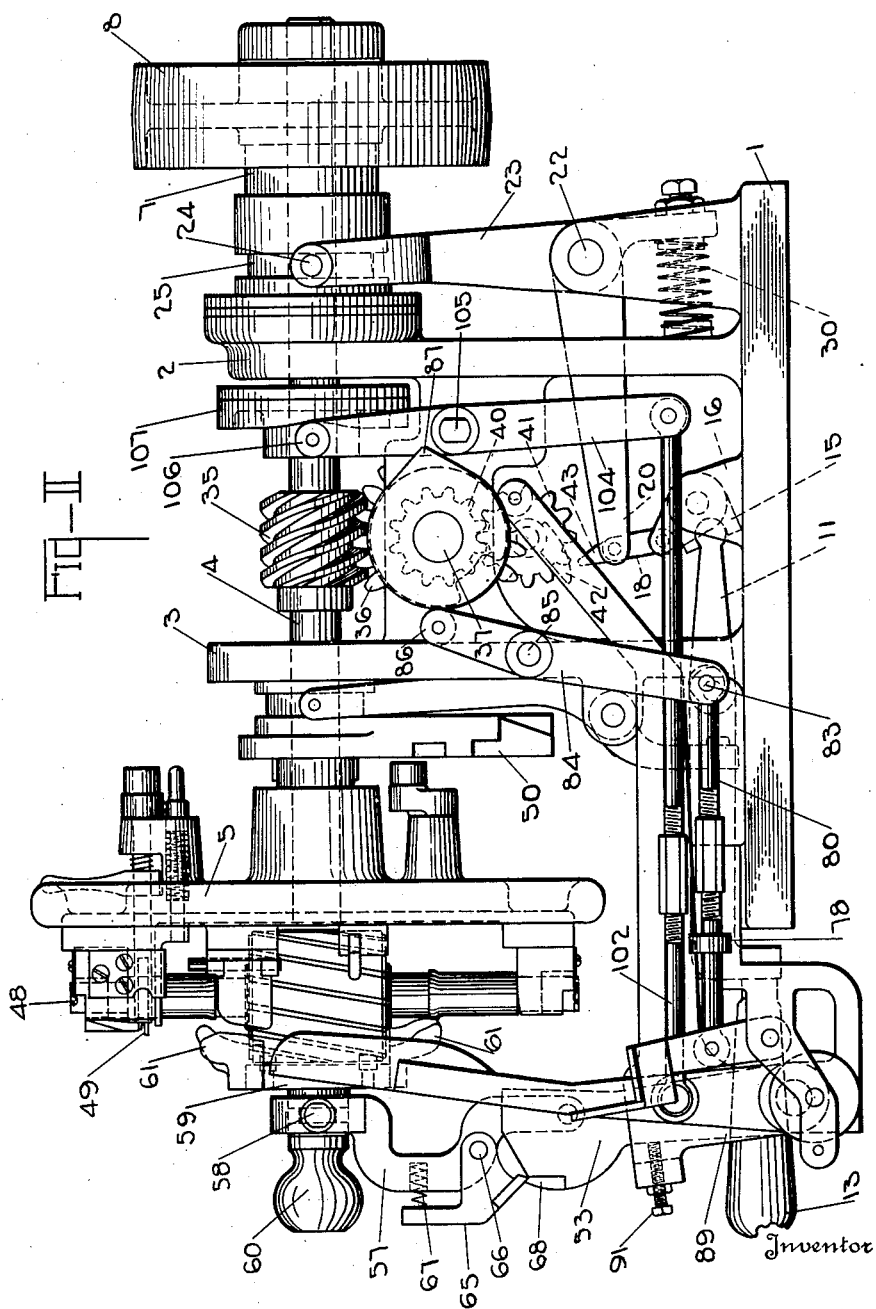
Inventor
Harrison H. Eaton
By Braselton, Whitcomb & Davis
Attorney Aug. 14, 1934.  H. H. EATON  1,969,734
AUTOMATIC ARMATURE WINDING MACHINE
Filed July 2, 1928   5 Sheets-Sheet 3
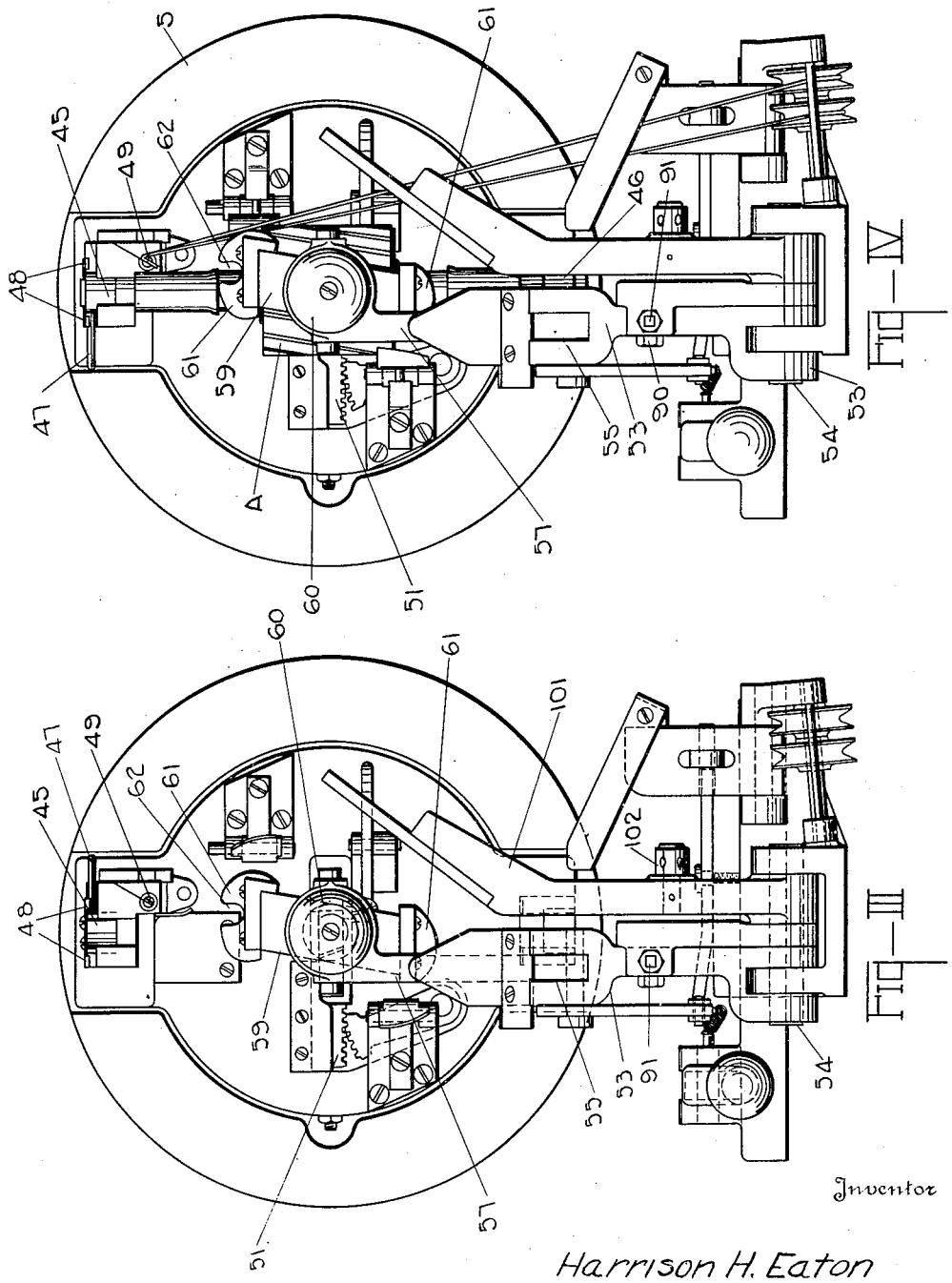
Inventor
Harrison H. Eaton
By Braselton, Whitcomb & Davis
Attorneys

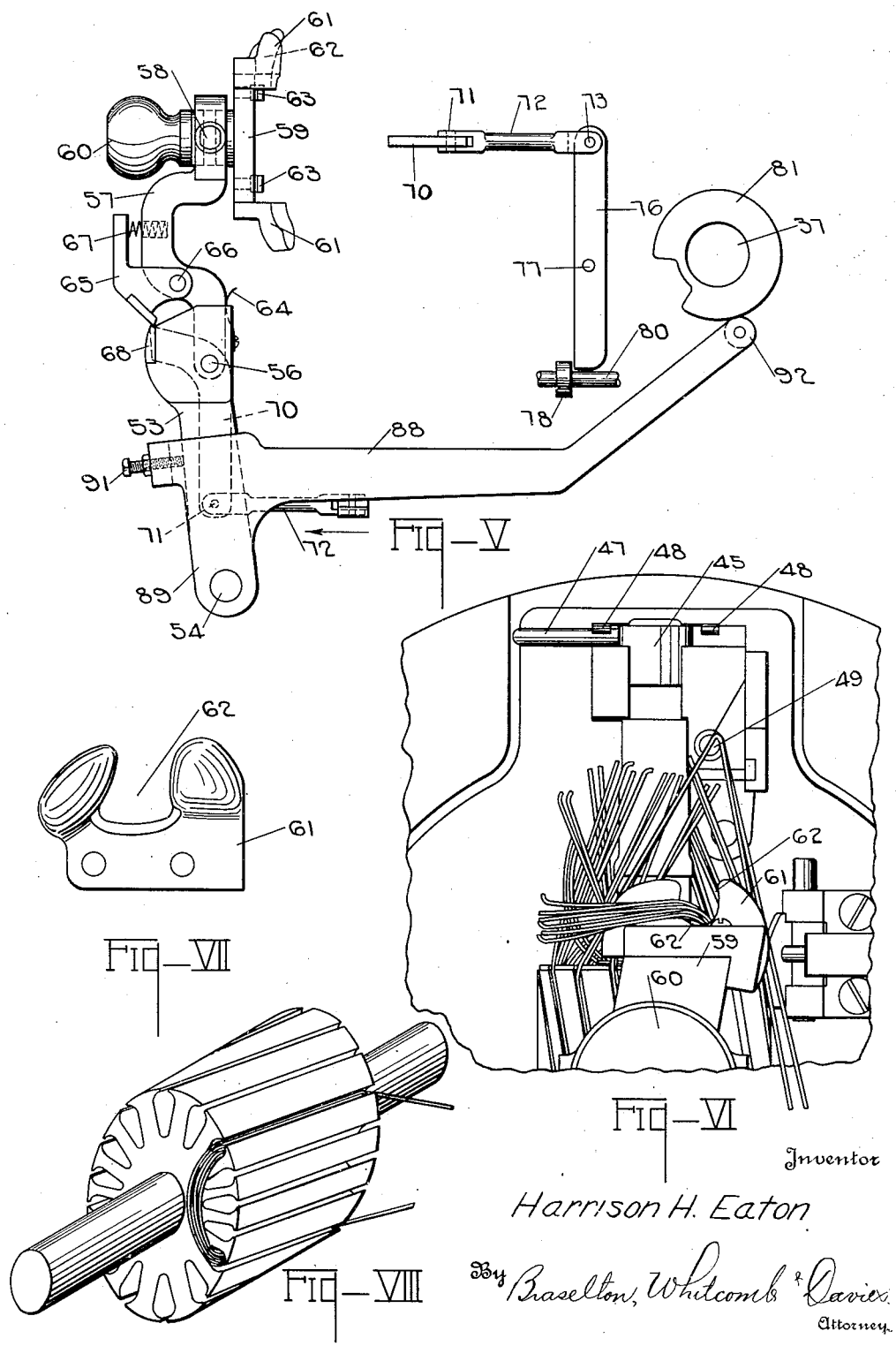

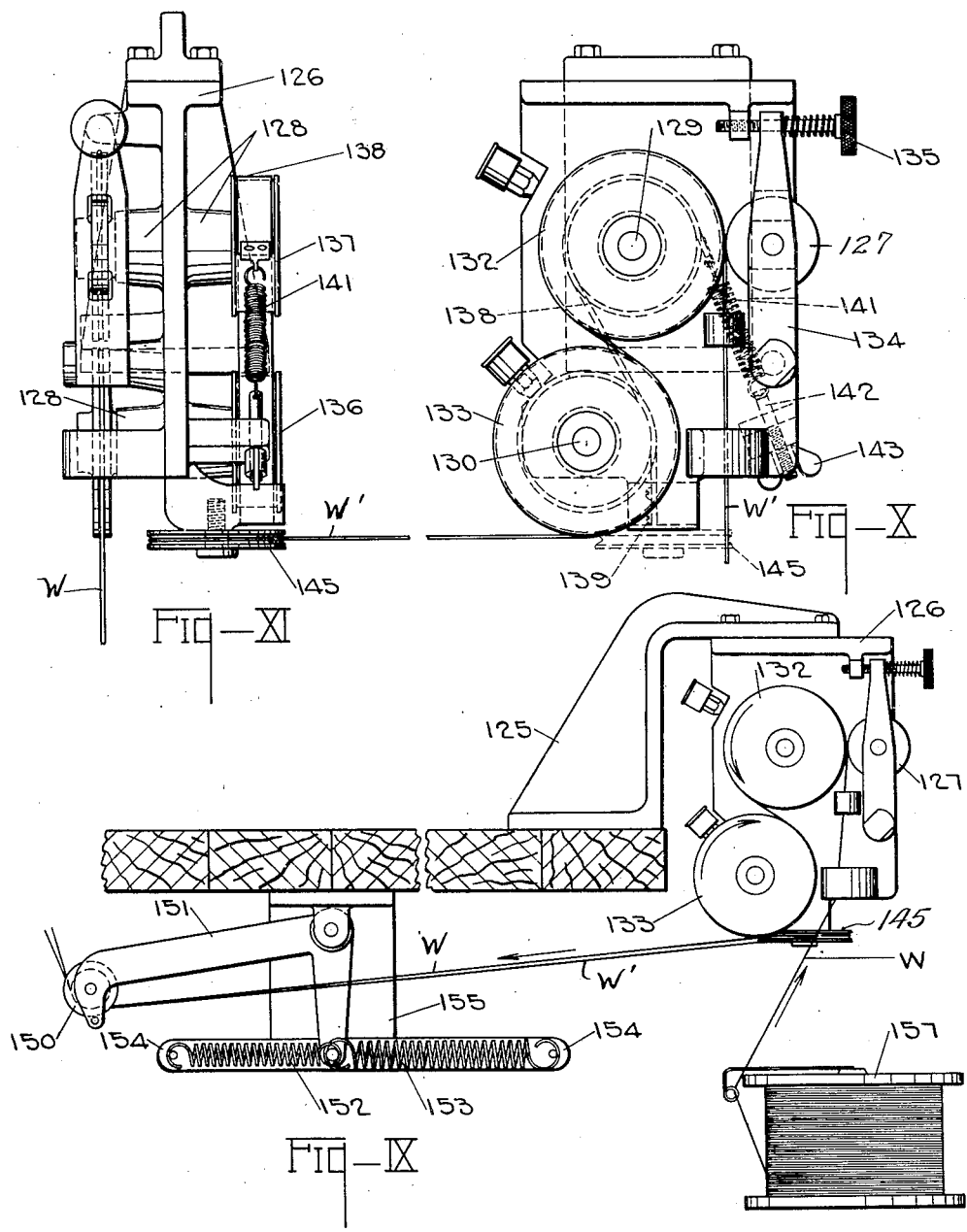

Patented Aug. 14, 1934

1,969,734

UNITED STATES PATENT OFFICE 1,969,734

AUTOMATIC ARMATURE WINDING MACHINE

Harrison H. Eaton, Toledo, Ohio, assignor to The Electric Auto-Lite Company, Toledo, Ohio, a corporation of Ohio Application July 2, 1928, Serial No. 289,973

9 Claims. (Cl. 242—13)

This invention relates to improvements in a machine for automatically winding the coils on an armature of a dynamo electric machine which is described and claimed in my co-pending application, Serial No. 14,367, filed March 10, 1925.

One of the principal objects of this invention is the provision of improved wire guiding means for use in machines for winding armatures of the multipolar type wherein the armature coils are non-diametrically arranged.

Another object of this invention is the provision of a wire guiding means for use in a machine for winding a multipolar armature wherein the wire receiving slots of the armature are arranged out of parallelism with the axis thereof.

Another object is the provision of a wire guiding means of this character which is adapted for engagement with the armature during winding operations and which will be automatically released from engagement with the armature after the completion of each armature coil.

A further object is the provision of a wire guiding means which is simple and positive in its operation and which is not liable to become deranged or broken through continued use.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure I is an elevational view showing the general arrangement of the armature winding machine and wire tension device.

Figure II is a side elevational view of an armature winding machine incorporating the wire guiding means of my invention.

Figure III is a front elevational view of the machine with the armature removed.

Figure IV is a view similar to Figure III showing the armature in winding position.

Figure V is an elevational view of the guiding means of my invention showing a portion of the operating means therefor.

Figure VI is an enlarged fragmentary detailed view of a portion of the armature supporting means showing the relative positions of the armature and wire guiding means during winding operations.

Figure VII is a top plan view of the wire guiding means.

Figure VIII is an isometric view of a multipolar armature showing the relative positions of the coils in the slots.

Figure IX is an elevational view of a wire tension device and support therefor.

Figure X is a front elevational view of the wire tension device.

Figure XI is a side elevational view of the parts shown in Figure X.

Referring particularly to Figure I of the drawings, the armature winding machine A per se is shown mounted upon one end of a support or table B, the wire tension means C being fixed to the other end of the table and connected to the wire supply D.

As particularly shown in Figure II, the armature winding machine comprises a base 1 having upwardly projecting portions 2 and 3 which support a longitudinally extending drive shaft 4. One end of the shaft 4 is provided with a plate or disc 5, the other end being connected by means of a clutch mechanism 7 to a pulley 8 which is adapted to be connected by any suitable means to a source of power. The clutch operating means comprises a lever 11, one end having an operating handle 13, the other end projecting into the bight of a U-shaped member 15 pivotally supported upon a projection 16 formed upon the base 1. The U-shaped member 15 is formed with an upwardly projecting arm which is connected to one arm of a bell crank lever 20 by means of a link 18, the bellcrank lever being suitably fulcrumed upon a shaft 22 carried in a bracket formed upon the frame 1. The other arm of the bell crank lever terminates in a yoke 23, the extremities of the yoke having transversely extending pins 24 adapted to extend into and engage the walls of a groove 25 in the clutch member, the bell crank lever being normally maintained in one position by means of an expansive spring 30. When the parts of the clutch operating mechanism are in the position shown in Figure I, the clutch is out of engagement with the drive shaft 4. A downward movement of the handle 13 of the clutch operating lever moves the member 15 in a clockwise direction and causes a movement of the bell crank lever to shift the clutch into operating position, that is operatively connecting the pulley 8 with the drive shaft 4.

I have provided means for automatically throwing the clutch mechanism out of engagement after the disc 5 has been rotated a predetermined number of times or after a certain number of turns of wire have been laid in the armature slot. To that end the main drive shaft 4 is provided with a worm 35 meshing with a worm wheel 36 carried upon a shaft 37. Shaft 37 also carries a spur gear 40 in mesh with a similar gear 41, the latter carrying a tripping pawl 42 which is adapted to contact with a projection 43 on the link 18 of the clutch setting toggle mechanism. It will be obvious that with every revolution of the gear 41 the pawl 42 will engage the projection 43 and automatically disconnect the clutch mechanism to stop the rotation of the armature supporting disc 5 and associated mechanism. The ratio of the worm gear 35 to the worm wheel 36 is such that the clutch mechanism is disengaged after the completion of each coil consisting of a predetermined number of turns of wire.

Referring particularly to Figures I, II and III of the drawings, the armature A is supported upon the disc 5 by locking means 45 and 46 located at either end of the armature shaft. The lower end of the shaft of the armature is first inserted in the locking means 46 and the means 45 receiving the other end of the shaft is provided with a manipulating handle 47 for operating this locking means to hold the armature in position. The handle 47 is adapted to be resiliently held in locked or open position by means of spring clips 48.

The wire holding and cutting means consists of a slotted pin 49 which is adapted to receive the end of the supply wires as shown so that as the disc 5 and armature A' are rotated the wire will be wound into the slots of the armature; the wire being guided by means hereinafter to be described. During the winding of the last half turn of wire to form a coil, the pin 49 is actuated by means of a cam 50 and severs the wire to form the ends of one coil and the beginning of the succeeding coil. Immediately after the wire severing operation occurs, the armature is shifted to a new position by means of rack and pinion mechanism 51 operated by another cam surface on the cam 50. As the wire cutting and severing mechanism together with the armature indexing mechanism are completely described in my copending application, I have not described them in detail.

I have provided an improved means for guiding the wire into the slots of the armature having engaging portions for the armature itself, which mechanism is automatically released from the armature in order to permit indexing thereof and which is positively locked in position to accurately guide the wire when the same is being wound on the armature. One embodiment which I have found satisfactory for this purpose comprises a pivoted supporting upright 53, pivoted on a bearing stud 54 slotted at its upper end as indicated at 55 to pivotally support at 56 the guide holding arm 57 having trunnions 58 carrying a frame 59 and having a handle 60, the frame 59 extending more or less diagonally with respect to the axis of the armature as shown in Figures IV and VI carrying the actual wire guiding pieces 61 provided with notches 62 for purposes as will hereinafter appear. The frame 59 carries spaced armature slot engaging lugs 63.

Leaf spring 64 shown in Figure V is connected with the upright support 53 and bears against the frame carrying member or arm 57 as shown.

The arm 57 is latched in upright position by latch 65 pivoted at 66 to the arm 57, a spring 67 contacting with one end of the latch, the point of the latch engaging over the edge of a latch piece 68 carried by the upright 53. A releasing dog or cam 70 is pivoted at 56 and extends downwardly adjacent the upright 53, being pivoted at 71 to an operating rod 72 therefor. The operating rod 72 is joined at 73 to a cross arm 76 pivoted at 77 and adapted to be engaged at its other end by a block or nut 78 carried by one of the main operating rods 80 for the other wire guiding means hereinafter to be described, which rod 80 as shown in Figure II, is pivoted at 83 to an arm 84 likewise pivoted at 85 and carrying a cam engaging roller 86 at its opposite ends adapted to engage and be operated by the cam 87 carried by the cross-shaft 37, the latter being driven from the main drive shaft of the machine through the worm 35 and wheel 36.

Referring to Figure V it will be seen that an arm 88 engages the notched cam 81 which is also mounted on the cross-shaft 37. The arm 88 is connected with the upright support 53 and has an elbow 89 also pivoted on the bearing shaft or stub 54. The arm 88 is connected to the upright 53 in an adjustable manner by means of a bolt 90, the rod being adjusted by manipulation of the screw 91 as shown in Figures III, IV and V.

When the bearing roller 92 of the arm 88 engages the high portion of the notched cam 81 the entire guide mechanism, including the upright 53 and arm 57, are held, or as it were, locked in engagement with the armature. When the notched portion of the cam 81 is in registration with the end of the arm 88 it will be seen that the wire guiding mechanism will move away from the armature until the roller 92 contacts with the bottom of the notch in the roller 81. This permits the operation of the armature indexing mechanism.

It will also be seen that when the cam 87 operates the roller 86 of the pivoted rod 84 in turn moving the rod 80 so that the nut 78 will engage the pivoted cross-arm 76 and swing it to move the rod 72. The movement of the rod 72 in the direction of the arrow shown in Figure V will swing the releasing dog 70 around its pivot 56 and lift the latch 65 out of engagement with the ledge 68. This occurs near the end of the winding of one coil before the operation of the armature indexing means, and the spring 64 causes the arm and all parts carried thereby to swing forward at right angles or thereabouts entirely away from the armatures. Thereafter, and when the guides are in this released position the machine operates to shear the wires in the wire holding pin 49, completing one coil of the armature and indexing the same for the beginning of the new coil.

In order to reset the guides 61 with the pins 63 in proper position for the winding in the new set of slots, the roller 92 is in the notched portion of the cam 81 so that the arm 88 and upright 53 and all parts carried thereby may be moved by the operator to bring the frame 59 into engagement with the armature and cause the latch 65 to latch on the ledge 68. When the machine operates, the cross-shaft 37 starting to turn, the roller 92 throws the arm 88 out of the notch and thereby locks all the operating parts of the guide, including the upright 53 and the pivoted arm 57 together with the wire guides 61 and 62 securely and rigidly in operative position in engagement with the armature.

In addition to the main wire guiding means I have provided an auxiliary wire guide 101 pivotally supported upon the shaft 54 and adapted to be operated by means of a rod 102 connected to one end of the guide 101 and at its other end to a cam controlled lever 104, the latter being pivoted at 105 and carrying at its outer end a cam roller 106 adapted for rolling engagement with the irregular surface of a cam 107 fixed upon the main driving shaft 4. The contour of the cam 107 is such as to impart an intermittent oscillatory movement to the auxiliary guide 101 with each revolution of the armature supporting disc 5.

It will be noted particularly in Figure IV of the drawings that the guide 101 is in engagement with the supply wires immediately adjacent the lower right corner of the armature core to be wound. It should be noted that while the main wire guiding pieces or members 61 serve to properly direct the wires into the slots in the armature core, the auxiliary wire guide 101 acts to direct the wires into proper engagement with the main guiding members 61. The intermittent oscillatory motion imparted to the guide 101 is essential in the particular embodiment disclosed wherein the core slots are not in parallelism with the axis of the core, and as the wire is directed into the upper end of a slot of the rotating armature core, the wire follows the diagonal path of the slot, arm 101 serving to redirect the wire to the next succeeding main guiding member 61, thus eliminating any possibility of the wire being directed to the wrong slot.

I have provided a means for producing a constant tension upon the supply wires which will now be described. Referring particularly to Figures I, IX, X, and XI, a bracket 125 adapted to be secured to the table B or other suitable support carries a frame 126 having a plurality of bosses 128 which are bored to receive shafts 129 and 130. Certain ends of the shafts are fixedly secured to grooved rolls 132 and 133, lying substantially in the same plane, over which the supply wire W is adapted to travel. The supply wire is properly guided into the groove in the roll 132 by means of a roll 127 engaging the periphery thereof, the roll 127 being carried by an arm 134 one end of which is pivoted to the frame 126, the other end adjustably secured to the frame by means of a screw 135. The other ends of the shafts 129 and 130 are secured to a pair of flanged drums 136 and 137, the peripheries of which are adapted to be engaged by a band 138 of suitable friction material one end of which is secured by means of screws 139 to the frame 126, the other end of the band being connected to a tension coil 141, the latter in turn secured to an adjustable screw 142 carried by the frame 126 and is rendered adjustable by means of a thumb nut 143. The purpose of the thumb nut 143 is to adjust the tension of the coil 141 to vary the frictional resistance of the band 138 acting upon the drums 136 and 137. It will be obvious that the frictional resistance acting to restrain rotation of the drums 136 and 137 will be transmitted to the rolls 132 and 133 which are engaged by the supply wire and offer a like resistance to the movement of the supply wire.

The side and end views of the tension device shown in Figures X and XI respectively are also illustrative of the respective positions of two of these devices arranged when it is desired to feed two wires, designated W and W', simultaneously to the armature winding machine. As particularly shown in Figures IX and XI, this is accomplished by passing wire W around the rolls 132 and 133, thence around the pulley 150 to the machine. The other wire W' shown in Figures IX, X and XI passes around the rolls 132 and 133 of the device in the manner illustrated in Figure X, thence around a pulley 145 secured to the device shown in Figure XI, the wire then passing around the pulley 150 to the winding machine. The guide pulley 145 is shown in Figure X in dotted lines and is not utilized when only one of the tension devices is in operation, and when two of the devices are used in an arrangement illustrated in Figures X and XI, the pulley 145 may be removed from one of the devices as shown in Figure X.

As shown in Figure IX, I have provided additional wire guiding rollers 150 revolubly supported upon one arm of a bell crank lever 151, the other arm of the lever being connected to the juxtaposed ends of tension coils 152 and 153, the opposite ends of which are connected to extended projections 154 forming an integral part of a supporting bracket 155.

In the operation, the wire is taken from a wire supply drum 157, is passed around the rolls 132 and 133 in a direction indicated by the arrows in Figure IX thence around the guiding pulley 150 and to the armature winding machine. In the event that the rolls 132 and 133 should momentarily offer increased resistance to the passing of the wire the bell crank arm 151 will be caused to oscillate and prevent the immediate breaking of the supply wire.

It is apparent that, within the scope of the invention modifications and different arrangements may be made other than is here disclosed, and the present disclosure is illustrative merely, the invention comprehending all variations thereof.

What I claim is:

1. In a machine, the combination of a support; a source of wire supply; wire holding means; armature holding means carried by said support; means for causing relative movement between said armature holding means and said support to effect a winding of wire from the wire supply on an armature; main wire guiding means adapted to engage said armature and supported independently of the armature holding means, and auxiliary wire guiding means including a movable arm for guiding the wire to said main guiding means.

2. In a machine, the combination of a support; a source of wire supply; wire holding means; armature holding means carried by said support; means for causing relative movement between said armature holding means and said support to effect a winding of wire from the wire supply on the armature; main wire guiding means adapted to be brought into engagement with the armature auxiliary wire guiding means including a movable member for guiding the wire to said main guiding means; and means for disengaging said main wire guiding means from said armature, said disengaging means operating independently of said armature holding means.

3. In a machine, the combination of a support; a source of wire supply; wire holding means; armature holding means carried by said support; means for causing relative movement between said armature holding means and said support to effect a winding of wire from the wire supply on the armature in a series of separate coils; main wire guiding means adapted for engagement with said armature during winding operations auxiliary wire guiding means including an arm positioned adjacent said main wire guiding means and adapted for oscillatory movement; and means for automatically disengaging the main wire guiding means from the armature upon the completion of each coil.

4. In a machine, the combination of a support; a source of wire supply; wire holding means; armature holding means carried by said support; means for causing relative movement between said armature holding means and the support to effect a winding of wire from the wire supply on the armature; wire guiding means adapted for engagement and rotation with said armature during winding operations, and means for periodically and simultaneously stopping the rotation of the armature and disengaging said wire guiding means therefrom.

5. In a machine, the combination of a support; a source of wire supply; wire holding means; armature holding means carried by said support; means for causing relative movement between said armature holding means and said support to effect a winding of wire from the wire supply on the armature in a series of separate coils, main wire guiding means adapted to effectively guide said wire during winding operations; auxiliary wire guiding means including an arm adapted for oscillatory movement cooperating with said main wire guiding means and means for rendering said main wire guiding means ineffective after the completion of each coil.

6. In a machine, the combination of a support; a source of wire supply; wire holding means; armature holding means carried by said support; means for causing relative movement between said armature holding means and said support to effect a winding of wire from the wire supply on the armature; a plurality of wire guiding means adapted to effectively guide said wire during winding operations; and means for automatically rendering one of said wire guiding means ineffective.

7. In a machine, the combination of a support; a source of wire supply; wire holding means; armature holding means carried by said support; means for causing relative movement between said armature holding means and said support to effect a winding of wire from the supply on the armature; main wire guiding means adapted for engagement with said armature; and auxiliary guiding means including an arm; means for imparting an oscillatory movement to said arm to guide the wire into the main guiding means in engagement with the armature, and means for periodically and simultaneously stopping the armature and disengaging said main wire guiding means therefrom.

8. In a machine of the character described, in combination a source of wire supply, armature holding and rotating means; means for effecting a winding of the wire on the armature, wire guiding means adapted for engagement with the armature during winding operations; means for periodically and simultaneously stopping the rotation of the armature and disengaging the wire guiding means therefrom, and an adjustable tension device connected to said wire supply.

9. In a machine, the combination of a support; a source of wire supply; wire holding means; armature holding means carried by said support; means for causing relative movement between said armature holding means and the support to effect a winding of wire from the wire supply on the armature in a series of separate coils; wire guiding means adapted to engage and rotate with the armature during the winding operations; and means for automatically disengaging said wire guiding means from the armature upon the completion of each coil.

HARRISON H. EATON.